US012533739B1

(12) United States Patent
Strivings

(10) Patent No.: US 12,533,739 B1
(45) Date of Patent: Jan. 27, 2026

(54) DETACHABLE BRACKET FOR SECURING ACCESSORY TABLE TO A TABLE SAW AND STAND

(71) Applicant: Evan Christopher Strivings, Duarte, CA (US)

(72) Inventor: Evan Christopher Strivings, Duarte, CA (US)

( * ) Notice: Subject to any disclaimer, the term of this patent is extended or adjusted under 35 U.S.C. 154(b) by 0 days.

(21) Appl. No.: 18/984,736

(22) Filed: Dec. 17, 2024

Related U.S. Application Data

(60) Provisional application No. 63/687,642, filed on Aug. 27, 2024.

(51) Int. Cl.
*B23D 47/02* (2006.01)

(52) U.S. Cl.
CPC ........... *B23D 47/025* (2013.01); *Y10T 83/773* (2015.04)

(58) Field of Classification Search
CPC .... B23D 47/025; B23D 57/0092; B25H 1/04; Y10T 83/773; Y10T 83/8763; Y10T 83/95; B23Q 1/72
USPC ......... 144/286.1, 287, 286.5; 83/477.2, 859; 108/48, 59, 77, 65, 69, 97, 152, 134
See application file for complete search history.

(56) References Cited

U.S. PATENT DOCUMENTS

| | | | | | |
|---|---|---|---|---|---|
| 2,297,647 | A * | 9/1942 | Chason | A47B 1/00 | 108/69 |
| 2,599,096 | A * | 6/1952 | Dirksen | B23D 45/06 | 144/286.1 |
| 3,026,158 | A * | 3/1962 | Freeman | A47B 5/04 | 108/134 |
| 4,209,045 | A * | 6/1980 | Bassett | B23D 47/025 | 144/287 |
| 4,350,193 | A * | 9/1982 | McCambridge | B25H 1/14 | 144/1.1 |
| 4,632,457 | A * | 12/1986 | Hofrichter | B60N 2/3047 | 248/240.1 |
| 6,161,486 | A * | 12/2000 | Boots | B25H 1/04 | 297/14 |
| 6,644,370 | B2 * | 11/2003 | Aigner | B23Q 1/0063 | 144/286.5 |
| 6,668,696 | B1 * | 12/2003 | Krohmer | B25H 1/14 | 144/287 |
| 7,210,180 | B2 * | 5/2007 | Malcolm | A61G 13/125 | 5/663 |
| 7,497,239 | B2 * | 3/2009 | Smith | B23D 47/025 | 144/286.5 |
| 8,056,590 | B2 * | 11/2011 | Liu | B25H 1/14 | 144/287 |

(Continued)

*Primary Examiner* — Laura M Lee
(74) *Attorney, Agent, or Firm* — Plager Schack LLP; Mark H. Plager; Naomi Mann

(57) ABSTRACT

A table saw attachment system for attaching a table saw to an accessory table provides a table saw attachment bracket comprising an L-brace including a main horizontal plate and a main vertical plate extending upwards from a back edge of the main horizontal plate and in perpendicular alignment thereto, and accessory table connection elements coupled to the L-brace and configured to non-permanently attach the accessory table to the L-brace. The main horizontal plate of the L-brace is configured to provide a platform which extends between and below a tabletop of the table saw and a tabletop of the accessory table, for capturing any material which falls off from the back side of the table saw.

8 Claims, 5 Drawing Sheets

(56) References Cited

U.S. PATENT DOCUMENTS 10,793,043 B2 * 10/2020 Tovani .................. B60N 3/001

* cited by examiner

DETACHABLE BRACKET FOR SECURING ACCESSORY TABLE TO A TABLE SAW AND STAND

RELATED APPLICATION

This application is claims benefit to Application No. 63/687,642 filed Aug. 27, 2024, which is incorporated by reference herein in its entirety.

BACKGROUND

The present disclosure relates generally to attachment systems and devices for non-permanent attachment of a table saw accessory to a table saw.

SUMMARY

According to various embodiments, disclosed is a table saw attachment system for attaching an accessory table to a table saw, which provides a table saw attachment bracket comprising an L-brace including a main horizontal plate and a main vertical plate extending upwards from a back edge of the main horizontal plate and in perpendicular alignment thereto, and accessory table connection elements coupled to the L-brace and configured to non-permanently attach the accessory table to the L-brace. In some embodiments, the main horizontal plate of the L-brace is configured to provide a platform which extends between and below a tabletop of the table saw and a tabletop of the accessory table, for capturing any material which falls off from the back side of the table saw.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
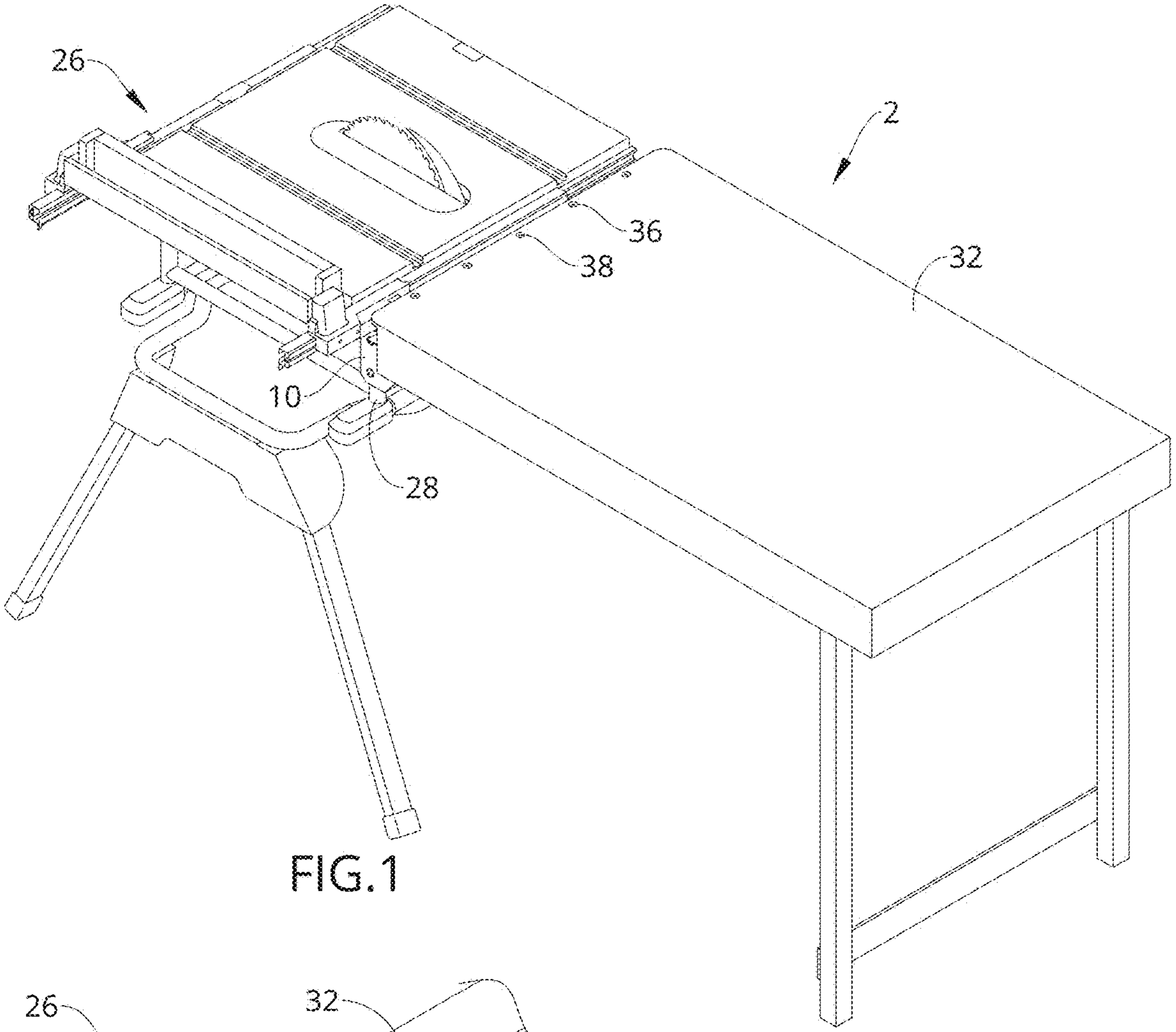
FIG. 1 is a top perspective view of a table saw attachment system according to certain embodiments, the system including a table saw and an accessory table attached to the table saw via an attachment bracket.
Figure 2:
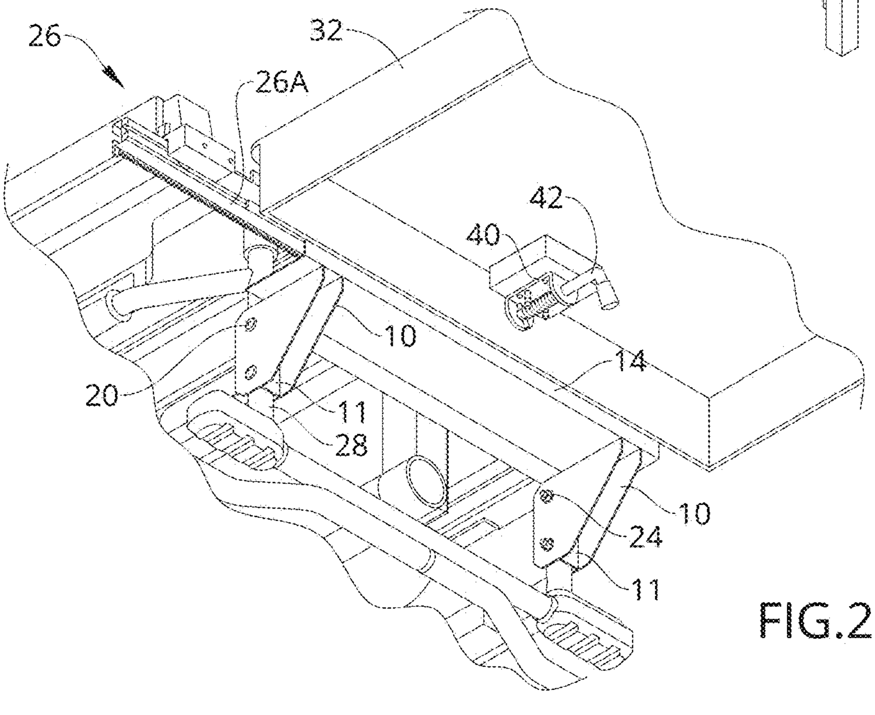
FIG. 2 is a bottom perspective detailed view of the table saw and an accessory table attached via the attachment bracket.
Figure 3:
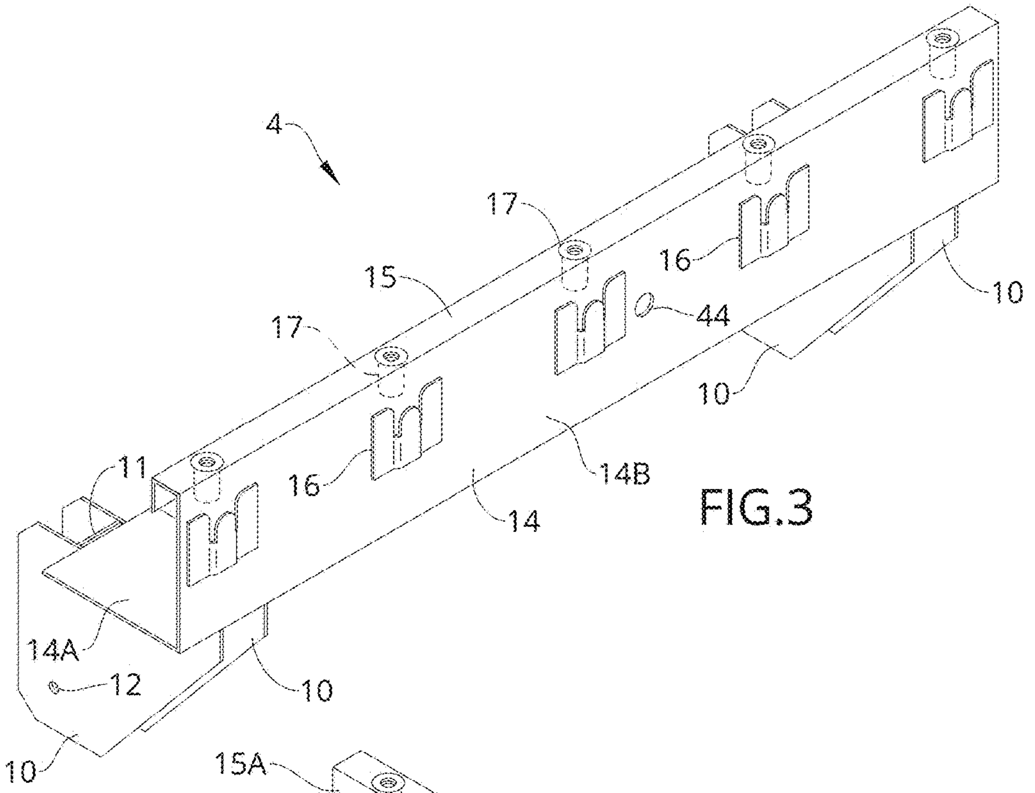
FIG. 3 is a front perspective view of the attachment bracket according to certain embodiment.
Figure 4:
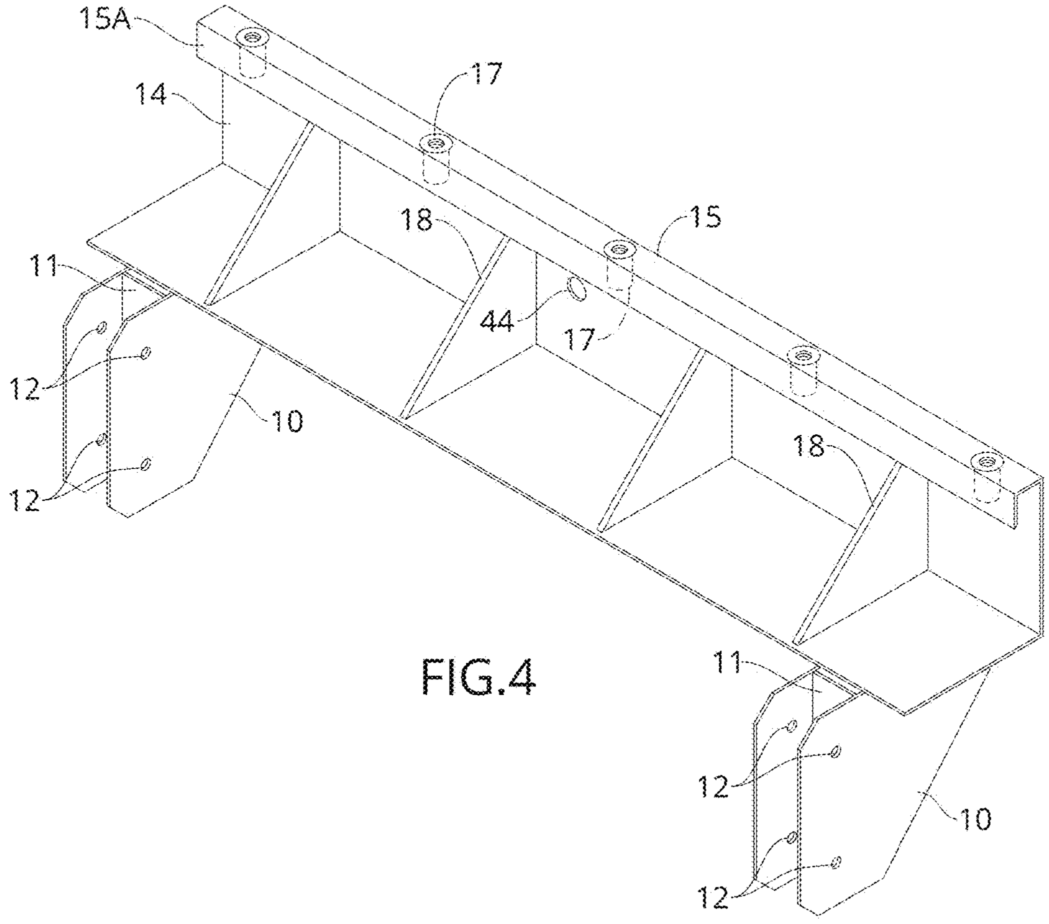
FIG. 4 is a rear perspective view of the attachment bracket.
Figure 5:
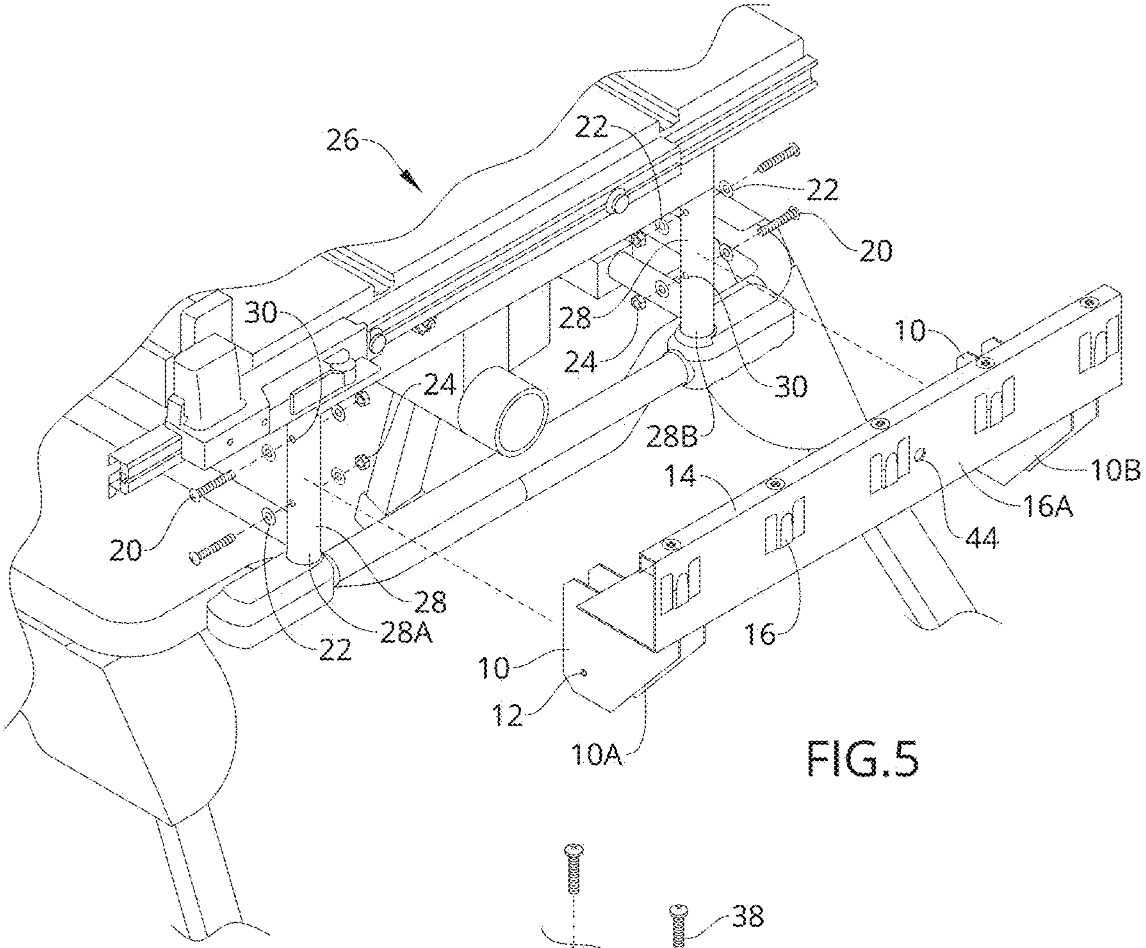
FIG. 5 depicts attachment of the bracket to the table saw.
Figure 6:
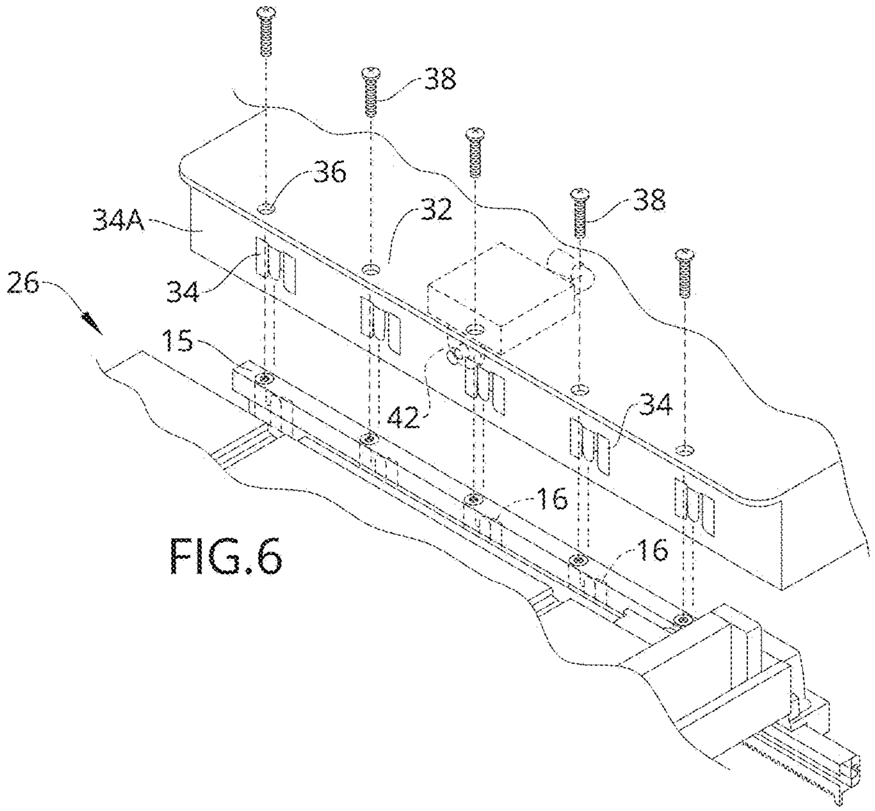
FIG. 6 depicts attachment of the accessory table to the bracket.
Figure 7:
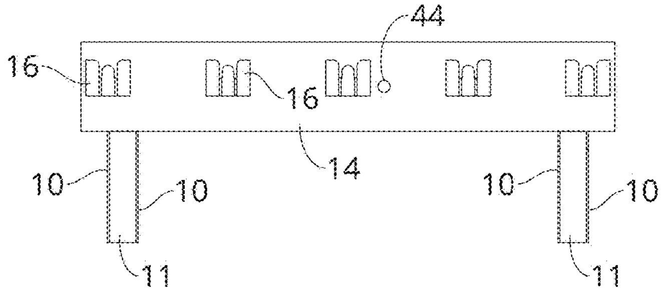
FIG. 7 is a front plan view of the bracket.
Figure 8:
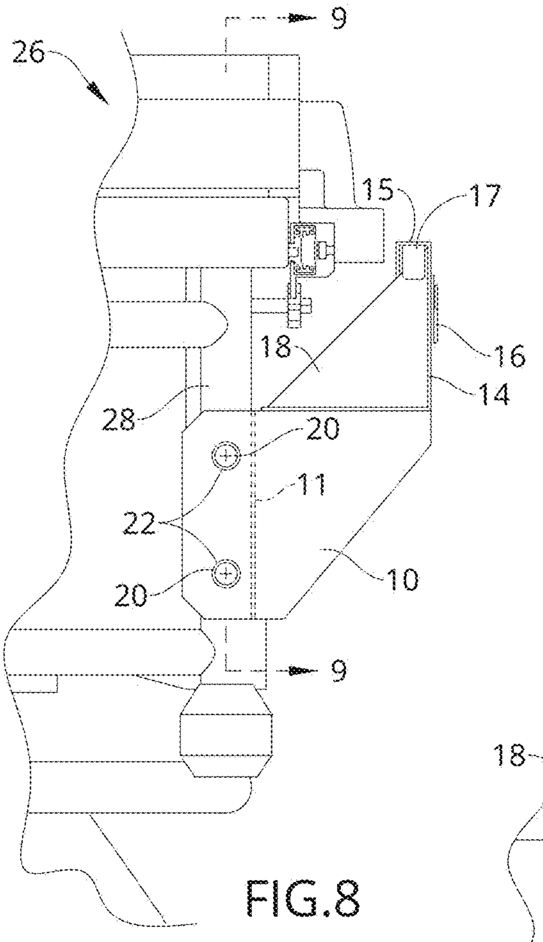
FIG. 8 is a side view of the bracket installed to the table saw.
Figure 9:
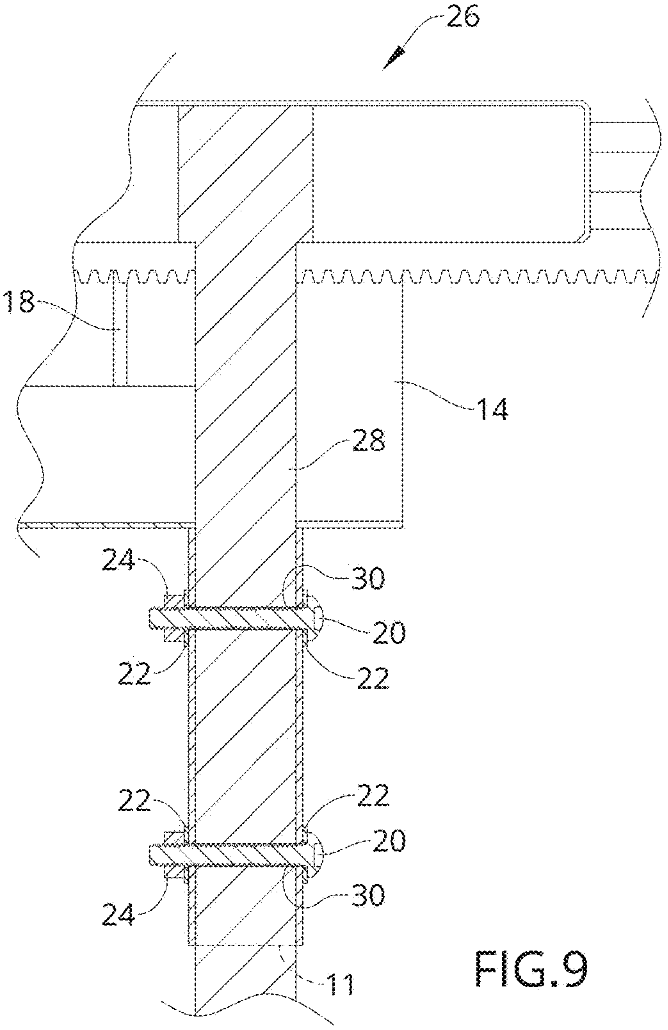
FIG. 9 is a section view taken along line 9-9 in FIG. 8.
Figure 10:
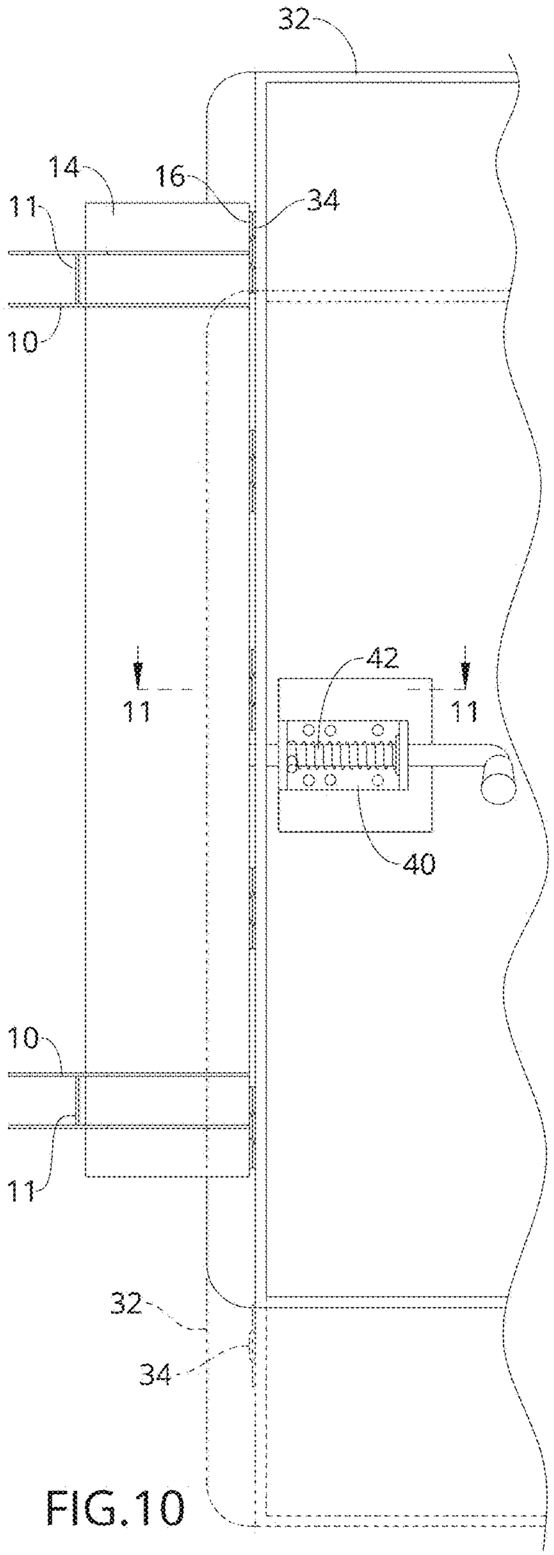
FIG. 10 is a bottom view, illustrating adjustability of the accessory table through variable alignments of interlocking members in the bracket and accessory table.
Figure 11:
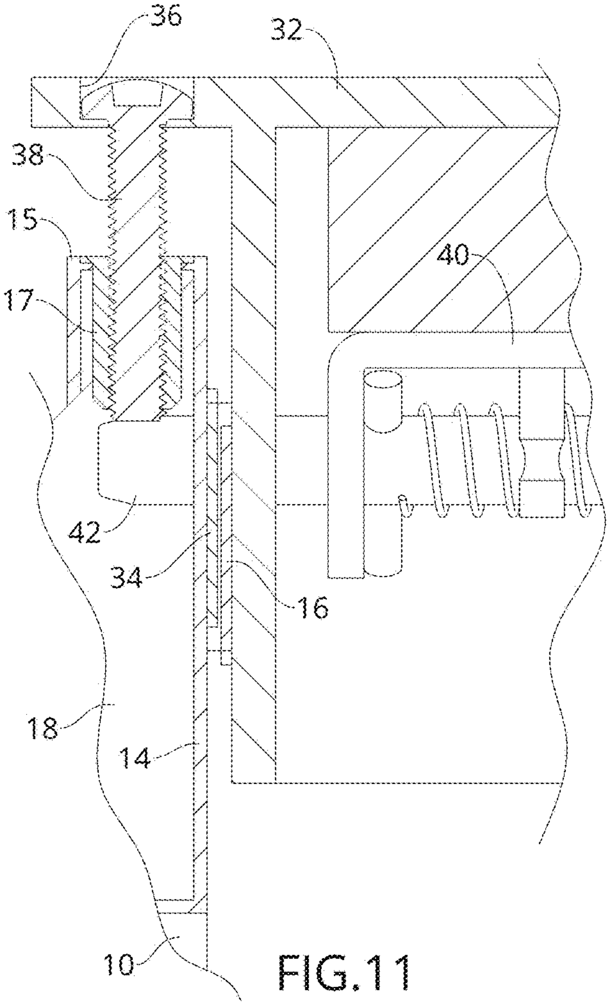
FIG. 11 is a detailed section view taken along line 11-11 in FIG. 10, illustrating mating of the interlocking members.

According to various embodiments as depicted in FIGS. 1-11, disclosed is a table saw attachment method and/or system 2 which provides a table saw attachment bracket 4 configured to attach an accessory table 32, to a portable table saw or stand 26 (referred to as "table saw 26"). In some embodiments, accessory table 32 may comprise for example, an outfeed or router table, or smaller work surfaces such as a compact router table, spindle sander table, and the like.

In certain embodiments, bracket 4 is attachable and detachable to a frame on the back side of table saw 26 and is further configured to attach to accessory table 32. The bracket 4 is also configured to capture material/debris falling off of the back side of table saw 26 (e.g., from cutting/sawing) so that the material is prevented from simply falling to the ground. This prevents clutter and reduces the potential for injury.

In one embodiment, bracket 4 comprises an L-brace 14 with bottom connection plates 10 configured to attach to table saw 26. L-brace 14 may include a main horizontal plate 14A and a main vertical plate 14B extending upwards from a back edge of main horizontal plate 14A and in perpendicular alignment thereto. In certain embodiments, connection plates 10 may be coupled to a bottom surface of main horizontal plate 14A, and are configured to position L-brace 14 adjacent a rear side 26A of the table saw, with main horizontal plate 14A between and below the tabletops of the table saw and accessory table to create a platform configured to capture material falling between the tabletops. In further embodiments, L-brace 14 includes accessory table connection elements for attachment of bracket 4 to accessory table 32. In some embodiments, the accessory table connection elements may include a first set of interlocking members 16 which may be provided along a back surface 16A of main vertical plate 14B, and are configured to mate to a second set of interlocking members 34 provided on a front side surface 34A of accessory table 32. In some further embodiments, the accessory table connection elements may include top threaded receptacles 17 configured to receive attachment screws 38 engaged through top holes 36 in accessory table 32. Furthermore, in certain embodiments, L-brace may comprise triangular ribs 18 or other structural reinforcement elements between main horizontal plate 14A and main vertical plate 14B.

Connection plates 10 are configured to attach to vertical columns or uprights 28 in the table saw frame which extend below the table saw tabletop 26B, and may be bonded (e.g., via welding, bolting, etc.) to an underside of main horizontal plate 14A, or may be an integral extension of main horizontal plate 14A. In some embodiments, connection plates 10 may comprise a first pair of vertical plates 10A with an intermediate spacer 11 extending between plates 10A; and a second pair of vertical plates 10B with another intermediate spacer 11 extending between plates 10B. First pair of vertical plates 10A including respective spacer 11 are positioned proximate a first end of L-brace 14 and define a slot frontwards of L-brace 14 configured to capture a first side upright 28A of the table frame. Second pair of vertical plates 10B including respective spacer 11 are positioned proximate a second end of L-brace 14 and likewise create a frontwards slot configured to capture a second side upright 28B of the table frame. Vertical plates 10A, 10B may further include holes 12 configured to align with corresponding holes 30 in uprights 28A, 28B, so that L-brace 14 can be connected to table saw 26 via threaded bolts 20 driven through the aligned holes, and secured via nuts 24 and washers 22, as shown. In certain embodiments, vertical plates 10A and 10B may extend approximately towards the rear edge of main horizontal plate 14A, but not necessarily so. In some embodiments, plates 10A, 10B may have an angled back edge, but not necessarily so. Additionally, spacers 11 may be positioned approximately in line with a front edge of main horizontal plate 14A, as shown. It shall be appreciated however, that the dimensions and geometries of plates 10 and spacers 11, including their relative positions, may vary in alternate embodiments. Additionally, it shall be appreciated that different attachment elements for coupling L-brace 14 to table saw 26 may be provided in alternate embodiments.

In certain embodiments, first set of interlocking members 16 and second set of interlocking members 34 may comprise flush mount brackets which are aligned in corresponding interlocking arrangement, as shown, to enable accessory table 32 to be quickly and securely attached to table saw 26 in a non-permanent fashion. In certain embodiments, the flush mount brackets are evenly spaced to allow for a variable horizontal position of the accessory table with respect to the backet 4/table saw 26 (see FIG. 10). More specifically, the user may shift alignment of accessory table 32 with respect to table saw 26 and attach these components using only a portion of the interlocking members. It shall be appreciated that any number of interlocking members 16, 34 may be used in alternate embodiments, and that these members can be in different shapes and sizes with different dimensions. In further embodiments, top holes 36 (which may be countersunk bolt holes) of accessory table 32 extend over front side surface 34A of accessory table 32 and are configured to align with top threaded receptacles 17 in bracket 4, so that bolts 38 may be threaded through the holes to secure accessory table 32 to table saw 26 in a more permanent but still detachable fashion. In embodiments, engagement between interlocking members 16, 34 is configured to align top holes 36 over threaded receptacles 17. In some embodiments, top threaded receptacles 17 may be provided within a top horizontal extension plate 15 that extends frontwards from a top edge of main vertical plate 14B, and in perpendicular alignment thereto. In some embodiments, a vertical extension plate 15A may extend downwards from a front edge of top horizontal extension plate 15 and in perpendicular alignment to extension plate 15, as shown. However, in other embodiments, threaded receptacles 17 may be provided directly within main vertical plate 14B, wherein main vertical plate 14B has a thickness sufficient for accommodating threaded receptacles 17. In a further example, bracket 4 may include a hole 44 in vertical plate 14B for receiving a latch bolt 42 of a spring latch 40 in accessory table 32. Spring latch 40 may be a component of a foldable leg assembly of the accessory table, or a dedicated attachment component for attachment to bracket 4. It shall be appreciated that any number of threaded receptacles 17 may be provided in alternate embodiments. Additionally, it shall be appreciated that different connection elements for attachment of accessory table 32 to bracket 4 may be used in alternate embodiments.

In embodiments, a user may initially install bracket 4 to table saw 26 via connection plates 10. Once bracket 4 is installed to table saw 26, accessory table 32 may be connected to the bracket. In certain embodiments, accessory table 32 may be lifted to place second set of interlocking members 34 in position to interlock with first set of interlocking members 16, then lowered to engage interlocking members 16 and 34 to one another. Bolts 38 may then be driven through top holes 36 which are aligned over threaded receptacles 17 for a sturdier connection, or spring latch 40 can be engaged to allow latch bolt 42 to pass through brace latch hole 44 located on main vertical plate 14B if desired.

As such, bracket 4 safely and securely attaches table saw 26 to accessory table 32 in a temporary fashion. Bracket 4 may be particularly useful in firmly securing an outfeed table to a table saw on construction sites or other work areas, but may also be used to attach any component part that has corresponding or matching attachment elements. Once the accessory table is secured to the bracket, the user can engage the saw in its normal use. The L-brace in the bracket can catch wood and other materials coming off the back of the saw after being cut, preventing the materials from falling off the back. The user need not employ unnecessary force to hold materials down to the saw at the end of the cut which reduces the likelihood of injury, as well as littering.

In certain embodiments, bracket 4 may be sized and configured for attachment to a specific table saw model. In some embodiments, table saw attachment system 2 also provides an accessory table which is configured for attachment to bracket 4; however, in other embodiments, accessory table 32 may be retrofitted by the user to include attachment elements such as interlocking members 34 and/or top holes 36 for attachment to bracket 4. According to various embodiments, bracket 4 may be made of materials such as steel, plastic, wood, and the like. It shall be appreciated that bracket 4 may be used for attachment of other items and accessories, or may be adapted for use with other types of workbenches and can be adapted to attach to other commercially available power tool platforms such as small benchtop router tables and spindle sander machines with the intention of allowing these platforms to have attachments and infeed/outfeed accessories of their own. It shall be appreciated that the disclosed system and/or components of the disclosed system may have different configurations in alternate embodiments. It shall be appreciated that components of table saw attachment system 2 may comprise any alternative known materials in the field and be of any size and/or dimensions. It shall be appreciated that the components of table saw attachment system 2 may be manufactured and assembled using any known techniques in the field.

It shall be understood that the orientation or positional relationship indicated by terms such as “upper”, “lower”, “front”, “rear”, “left”, “right”, “top”, “bottom”, “inside”, “outside” is based on the orientation or positional relationship shown in the accompanying drawings, which is only for convenience and simplification of describing the disclosed subject matter, rather than indicating or implying that the indicated device or element must have a specific orientation or are constructed and operated in a specific orientation, and therefore should not be construed as a limitation of the present invention.

As used herein, the articles “a” and “an” are intended to include one or more items, and may be used interchangeably with “one or more.” Where only one item is intended, the term “one” or similar language is used. Also, as used herein, the terms “has”, “have”, “having”, “with” or the like are intended to be open-ended terms. Further, the phrase “based on” is intended to mean “based, at least in part, on” unless explicitly stated otherwise.

The constituent elements of the disclosed device and system listed herein are intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device. Terms such as ‘approximate,’ ‘approximately,’ ‘about,’ etc., as used herein indicate a deviation of within +/−10%. Relationships between the various elements of the disclosed device as described herein are presented as illustrative examples only, and not intended to limit the scope or nature of the relationships between the various elements. Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A table saw attachment method comprising:

attaching an accessory table to a portable table saw via a table saw attachment bracket, the table saw including a motorized rotatable circular saw blade, wherein the table saw attachment bracket is configured to attach to the portable table saw adjacent a back side of the portable table saw, wherein the table saw attachment bracket comprises:

an L-brace including a main horizontal plate and a main vertical plate extending upwards from a back edge of the main horizontal plate and in perpendicular alignment thereto, accessory table connection elements coupled to the L-brace and configured to attach the accessory table to the L-brace, and table saw attachment components coupled to an underside of the main horizontal plate in the L-brace, wherein the main horizontal plate of the L-brace is configured to provide a platform which extends between and below a tabletop of the table saw and a tabletop of the accessory table, for capturing material which falls off from the back side of the table saw, wherein the table saw attachment components are configured to attach to vertical columns in the table saw which extend below the tabletop of the table saw, wherein the accessory table connection elements include a first set of interlocking members provided along a back surface of the main vertical plate, the first set of interlocking members configured to mate to a second set of interlocking members provided on a front side surface of the accessory table for a non-permanent attachment between the accessory table and the L-brace, and, wherein the table saw attachment components include bottom connection plates which are in perpendicular alignment to the main horizontal plate, the bottom connection plates including:

a first pair of vertical plates positioned proximate a first end of the L-brace and defining a first slot frontwards and below the main horizontal plate, the first slot configured to capture a first side vertical column of the table saw vertical columns; and a second pair of vertical plates positioned proximate a second end of the L-brace and defining a second slot frontwards and below the main horizontal plate, the second slot configured to capture a second side vertical column of the table saw vertical columns.

2. The table saw attachment method of claim 1, wherein the table saw attachment bracket is configured to attach to the table saw by driving first fasteners through corresponding holes in the first pair of vertical plates, and by driving second fasteners through corresponding holes in the second pair of vertical plates.

3. The table saw attachment method of claim 2, further comprising a spacer plate between each of the first pair of vertical plates and the second pair of vertical plates.

4. The table saw attachment method of claim 1, wherein the first set of interlocking members and the second set of interlocking members are aligned in corresponding positions along the back surface of the main vertical plate and the front side surface of the accessory table, such that a mating attachment between the first set of interlocking members and the second set of interlocking members fixes an alignment of the accessory table to the table saw.

5. The table saw attachment method of claim 4, wherein the first set of interlocking members and the second set of interlocking members comprise flush mount brackets.

6. The table saw attachment method of claim 1, wherein the accessory table connection elements further include at least one of:

a) top threaded receptacles configured to receive attachment screws engaged through top holes in a front section of the tabletop of the accessory table, wherein the top threaded receptacles are provided within a top horizontal extension plate that extends frontwards from a top edge of the main vertical plate or are provided directly within the main vertical plate; and b) a brace latch hole located in the main vertical plate and configured to receive a latch bolt of a spring latch of the accessory table.

7. The table saw attachment method of claim 1, wherein the accessory table connection elements include top threaded receptacles configured to receive attachment screws engaged through top holes in a front section of the tabletop of the accessory table, wherein the top threaded receptacles are provided within a top horizontal extension plate that extends frontwards from a top edge of the main vertical plate or are provided directly within the main vertical plate.

8. The method of claim 1, wherein the table saw attachment bracket is configured to provide an open space between a back side edge of the tabletop of the table saw and a front side edge of the tabletop of the accessory table in attachment of the accessory table to the table saw.

* * * * *